(12) United States Patent
Braga (10) Patent No.: US 11,472,348 B1
(45) Date of Patent: Oct. 18, 2022

(54) PORTABLE APPARATUS FOR HOLDING AND TRANSPORTING FISHING RODS

(71) Applicant: Fishitch LLC, Daytona Beach, FL (US)

(72) Inventor: Carlos Braga, Port Orange, FL (US)

(*) Notice: Subject to any disclaimer, the term of this patent is extended or adjusted under 35 U.S.C. 154(b) by 230 days.

(21) Appl. No.: 16/737,339

(22) Filed: Jan. 8, 2020

Related U.S. Application Data (60) Provisional application No. 62/790,979, filed on Jan. 10, 2019.

(51) Int. Cl.
*B60R 9/08* (2006.01)
*A01K 97/10* (2006.01)
*A47B 81/00* (2006.01)

(52) U.S. Cl.
CPC ............... *B60R 9/08* (2013.01); *A01K 97/10* (2013.01); *A47B 81/005* (2013.01)

(58) Field of Classification Search
CPC . B60R 9/08; B60R 9/06; A47B 81/005; A47F 7/0028; A01K 97/10; A01K 97/00; A01K 97/08; B62B 2202/403; Y10S 224/922
USPC ........................................................ 224/400
See application file for complete search history.

(56) References Cited

U.S. PATENT DOCUMENTS

| | | | |
|---|---|---|---|
| 5,033,223 A | | 7/1991 | Minter |
| 5,435,093 A | * | 7/1995 | Minorics ................ A01K 97/10 |
| | | | 43/19.2 |
| 5,904,281 A | | 5/1999 | Mooers |
| 6,129,371 A | * | 10/2000 | Powell ...................... B60R 9/06 |
| | | | 224/502 |
| 8,393,111 B1 | | 3/2013 | Johnson |
| 8,800,831 B2 | * | 8/2014 | Gray ......................... B60R 9/10 |
| | | | 224/532 |
| 9,499,104 B2 | * | 11/2016 | Hux .......................... B60R 9/06 |
| 9,986,827 B1 | | 6/2018 | Long |
| 2014/0346206 A1 | * | 11/2014 | McKnight ............ A47B 81/005 |
| | | | 224/404 |

* cited by examiner

*Primary Examiner* — Nathan J Newhouse
*Assistant Examiner* — Matthew T Theis
(74) *Attorney, Agent, or Firm* — Lori Sandman, Esq.

(57) ABSTRACT

The invention disclosed herein comprises an apparatus and method of use for holding, locking and transporting fishing rods on the exterior of a vehicle. The apparatus is easily and removably attached to a standard and commercially available trailer hitch. The invention is modular and adjustable; the number of rods carried can be changed, and the orientation in which the rods are mounted and transported can rotate between a vertical and horizontal configuration. Furthermore, the apparatus is constructed of lightweight, durable materials and can be readily disassembled for convenient storage.

16 Claims, 7 Drawing Sheets

PORTABLE APPARATUS FOR HOLDING AND TRANSPORTING FISHING RODS

CROSS-REFERENCE TO RELATED APPLICATIONS

This application claims the benefit of U.S. Provisional Patent Application No. 62/790,979, filed Jan. 10, 2019, which is incorporated by reference herein in its entirety.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

Fishing, one of the most popular outdoor activities in the world, often requires that fishing rods be transported inside the cabins of vehicles such as cars, trucks, SUV's and ATV's. However, this may pose serious risks to the vehicle's occupants and those of other vehicles on the road. Typically, fishing rods are several feet long, take up significant cabin space, and are often insufficiently secured. The rods can shift during travel and distract the driver, potentially causing an accident or injury to the driver or other occupants of the vehicle. The rods themselves directly pose a danger in the event of an accident, as they can become projectiles. In addition, fishing rods often have barbed hooks attached when they are being transported and can easily pierce and become firmly lodged in soft tissue. Also, fishing rods are very often still wet when placed back in the vehicle after a fishing trip; they can harbor moisture, bacteria and viruses creating an unsanitary environment inside the cabin as well as potentially cause damage to the vehicle interior. Additionally, smaller vehicles with smaller cabins are limited in the number of rods that can be transported. And, the act of strategically fitting rods inside the cabin is often a time-consuming inconvenience.

One solution to the problems associated with transporting fishing rods inside a vehicle is to transport them on the outside. Because rods placed on the outside of a vehicle are subject to wind resistance during travel, securely anchoring the rods to the vehicle is critical. Also, it is desirable to be able to lock the rods in place, which is more of a challenge when they are outside the vehicle. Additionally, rods placed on the back of a truck or vehicle with a door or hatch must be removed to access the contents of the vehicle, which can be time-consuming and inconvenient.

Currently, exterior mounted rod holders are commercially available that connect to the hitch of an automobile for convenient attachment, since many vehicles already have or are capable of supporting a standard trailer hitch. Generally, these solutions are heavy, and the rod cups are welded into a rigid position, limiting the device's capacity to a specific number of rods. Also, devices presently disclosed cannot be easily dismantled for storage, so they are cumbersome and difficult to store when not in use.

What is needed is an improved apparatus for holding and transporting fishing rods that is lightweight, removably and adjustably attaches to a point on the outside of a vehicle, lockable, and can expand to include the desirable number of rod holders. As disclosed herein, the present invention accomplishes all this, and additionally can be rapidly assembled and disassembled for easy and convenient storage.

SUMMARY OF THE INVENTION

According to embodiments of the present invention, an apparatus for holding and transporting fishing rods is disclosed that is easily and removably attachable to a standard and commercially available trailer hitch. The apparatus is adjustable; the number of rods carried can be changed, and the orientation in which the rods are mounted and transported can rotate between a vertical and horizontal configuration. Furthermore, the apparatus may be constructed of lightweight materials and can be readily disassembled for convenient storage.

The invention comprises a main shaft that removeably attaches to a vehicle by being inserted into and connected via fasteners with a standard trailer hitch receiver. The main shaft conforms to the hitch receiver; it is sized and shaped to fit within the hitch receiver and be secured therein with a hitch pin. The main shaft also comprises a plurality of apertures and a main shaft receiving channel. This channel receives and conforms to a main spacer that also has a plurality of apertures. When the main spacer is inserted into the main spacer channel and their respective apertures are aligned, fasteners removeably pass through the apertures in the main shaft and the main spacer, allowing the spacer to be horizontally disposed at a right angle relative to the main shaft and secured within it at multiple rotational positions, depending on which aperture is positioned and occupied by a fastener.

The main spacer is removably connected to one or more receivers, capable of connecting the rod holders to the device. The receivers are symmetrically configured such that they can accept and secure a plurality of spacers, including both the main spacer and holder spacers, thereby extending the device outward laterally. Each receiver further comprises one or more apertures capable of alignment with apertures on the holder spacers such that a rod holder can pass through the receiver and be secured therein. Holder caps, made of a flexible and relatively soft material such as rubber, silicon or similar material, protect and help to secure the rods within the rod holders. Also, fishing rods may be locked within the holders, which may contain individual locking mechanisms. In one embodiment, apertures within the rod holders can receive lockable cable capable of binding individual rod hardware, wherein the cable is attached to a lock. In another embodiment, locks can secure the rods by attaching directly to apertures in individual rod holders. Appropriate locks include but are not limited to combination locks, keyed padlocks or electronically or digitally controlled locks to secure rods. In a different embodiment, a system to lock and secure the entire device is used. One skilled in the art would recognize that various locking mechanisms that attach to or integrate with the rod holders could be used to secure and lock fishing rods within the device and still fall within the disclosure presented herein.

The invention comprises a one-point, hand actuated swivel component that allows the apparatus to pivot in order to easily change to a horizontal configuration, rendering a hatch, door or tailgate of a vehicle accessible while the device and rods are still attached. The attachment and swivel components require no tools. Furthermore, the invention disclosed herein is modular; it can be expanded from one rod holder to multiple holders, so that a user does not carry too many or too few rod holders.

While various embodiments are described herein, it should be appreciated that the present invention encompasses many inventive concepts that may be embodied in a wide variety of contexts. Illustrative embodiments of the invention are described below. Not all features of an actual implementation for all embodiments are necessarily described in this specification. In the development of any such actual embodiment, implementation—specific decisions may be made to achieve the design specific goals, which may vary from one implementation to another. It will be appreciated that such a development effort would be a routine undertaking for persons of ordinary skill in the art having the benefit of this disclosure.

In one embodiment, the exterior facing end of the main shaft includes one or more brake lights; the wiring of the brake lights passes through the main shaft to the trailer hitch receiver and connects to the trailer hitch brake light wiring.

In various embodiments of this invention, the sequence of rod holder receivers and receiver spacers may be assembled perpendicular, parallel, diagonal or other orientations relative to the main shaft.

In one embodiment, the rod holder receiver and rod holder may be constructed to form a single component. Also, the rod holder receiver and receiver spacer may be constructed to form a single component. In another embodiment, the rod holder receiver and rod holder and receiver spacer may all be integrated to form a single component.

In another embodiment, the main shaft and main spacer may be constructed to form a single component.

In another embodiment of this invention, the apparatus may be fitted with rifle holders in addition to, or in place of, rod holder receivers and or rod holders.

The apparatus for holding and transporting fishing rods may be constructed of aluminum, steel, carbon fiber, plastic or any other suitably durable material, or combination of materials. The shape of the various connecting components of the apparatus, including the main shaft, receivers and spacers, may be square, round, oval or of any complimentary shape capable of interacting with each other. In addition, the apparatus and its components may be constructed in a variety of dimensions to fit various trailer hitch receivers and/or to suit load requirements. Although the most common trailer hitch receiver inner dimension is 2" and the most common trailer hitch safety pin is 1.5" in diameter, the dimensions of the apparatus main shaft and the main shaft safety pin holes may be built to any dimension necessary to accommodate a range of trailer hitch receiver and safety pin dimensions.

The attachment of each component to another in the aspects and embodiments described above may be achieved by use of one or more screws, pins, or similar fasteners. Furthermore, when screws are used to pass through two overlapping holes, either first, second, or both holes may be threaded.

REFERENCE CHARACTERS USED IN THE DRAWINGS

1. Main shaft
2. Main shaft receiving channel
3. Main shaft securing aperture
4. Main shaft hitch aperture
5. Main spacer
6. Main spacer securing aperture
7. Rod holder
8. Receiver spacer
9. Rod holder receiver vertical channel
10. Spacer aperture
11. Rod holder receiver
12. Receiver connector
13. Receiver aperture
14. Receiver end aperture
15. End rod holder receiver
16. End rod holder receiver closed end
17. Rod holder aperture
18. Rod holder cap
19. Lateral segment
20. Main shaft first end
21. Main shaft second end
22. Main spacer apertures
23. Fasteners
24. Rod holder open top end
25. receiver spacer open end
26. main spacer open ends
27. Main spacer positioning apertures
28. Swivel component

BRIEF DESCRIPTION OF THE SEVERAL VIEWS OF THE DRAWINGS

The attached drawing figures form part of the present specification and are included to further demonstrate certain aspects of the present claimed subject matter. The claimed subject matter may be better understood by reference to one or more of these drawings in combination with the description of figures and embodiments presented herein. A more complete understanding of the present embodiments and further features and advantages may be acquired by referring to the following descriptions taken in conjunction with the accompanying drawings, in which like reference numerals may identify like elements with the same or similar reference numerals.

FIGS. 5 (a-d) show the apparatus in various positionable configurations.

DESCRIPTION OF THE INVENTION

In the following description, an apparatus and method for holding and transporting fishing rods is disclosed. Skilled readers will appreciate that each component mentioned in the disclosure may be constructed of materials of a range of shape, gauge, length, or density consistent with their function and sufficiently strong and durable, and may be hollow or solid, as required to assure quality and performance. Also, steps in any described method or process, including assembly of the device, may be shifted sequentially relative to each other and still be considered within this disclosure.

The invention disclosed herein comprises an apparatus and method of use for holding and transporting fishing rods. The device is modular; it can be extended in segments comprising components including spacers, receivers and connectors which support the rod holder. These segments adjust the lateral length of the device. Each lateral segment can connect with another or a closed end and be removably attached by aligning their complimentary ends and passing one or more screws through one or more apertures in the female end of the segment and one or more apertures in the male end of another segment. In this way, the apparatus capacity can be changed to hold and transport more or fewer rods.

The apparatus can additionally function as an independent holder of rods when the device is not connected to a vehicle; when removed the sturdy components can function as a ground support by driving the apparatus into the sand.

Figure 1:
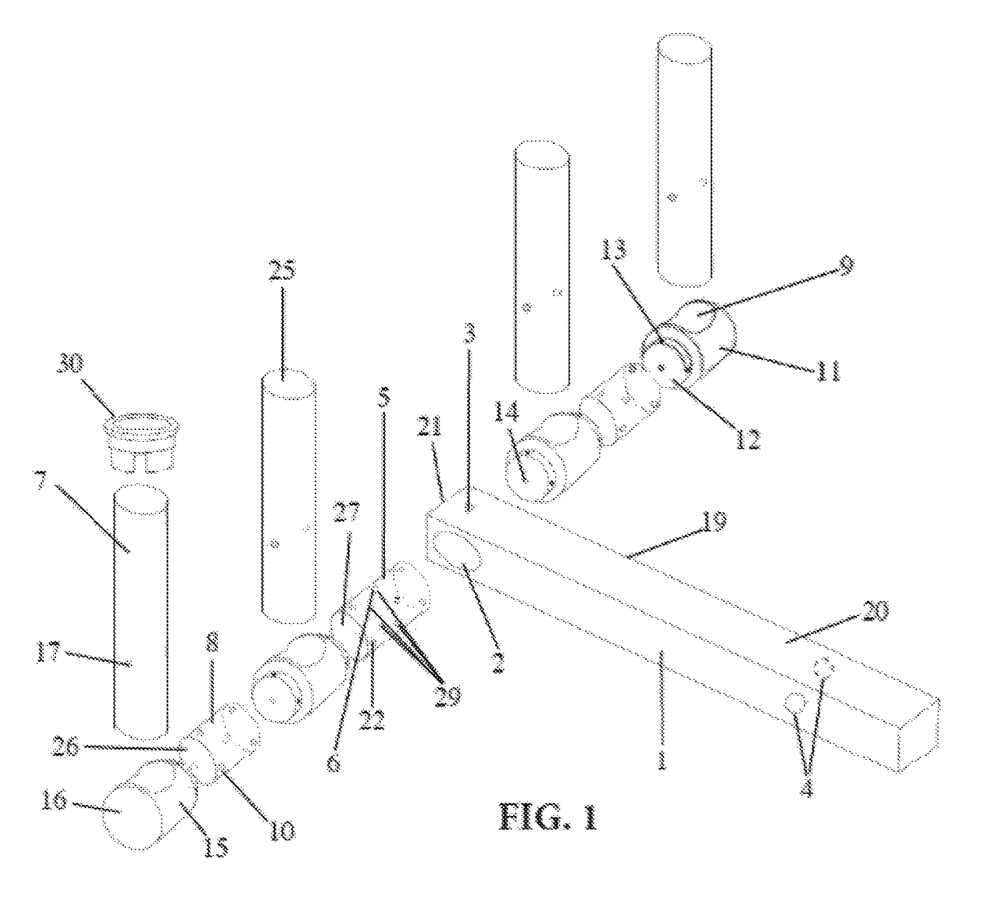
FIG. 1 is a perspective view of an apparatus for holding and transporting fishing rods and its components.

In FIG. 1, an overview of the various parts of the apparatus and their relative positions is shown. Generally, the apparatus comprises a main shaft 1 which includes a main shaft receiving channel 2 and one or more main shaft securing apertures 3. The main shaft 1 is configured with longitudinal axis and at least two ends, and includes a main shaft hitch aperture 4 located on a main shaft first end 20 and positioned so that a trailer hitch pin can pass horizontally through it to removably affix the main shaft first end 20 to a vehicle trailer hitch. A main spacer 5 conforms to and is supported within the main shaft receiving channel 2, and also comprises a plurality of main connector positioning apertures 29 for securing it. Main spacer securing apertures 6 pass through the main spacer 5 and align with main shaft securing apertures 3 such that swivel components 28 can pass through one or more of the apertures in the main shaft 1 and one or more apertures in the main spacer 5 and releasably secure them at multiple rotational positions, depending on which main connector positioning aperture 29 is occupied by a swivel component 28. Receiver spacers 8 comprising a plurality of receiver apertures 13 connect to rod holder receivers 11 and the other components of the lateral segment 19 shown in FIG. 2, allowing the apparatus to extend laterally and add the capacity to transport additional rods.

Figure 2:
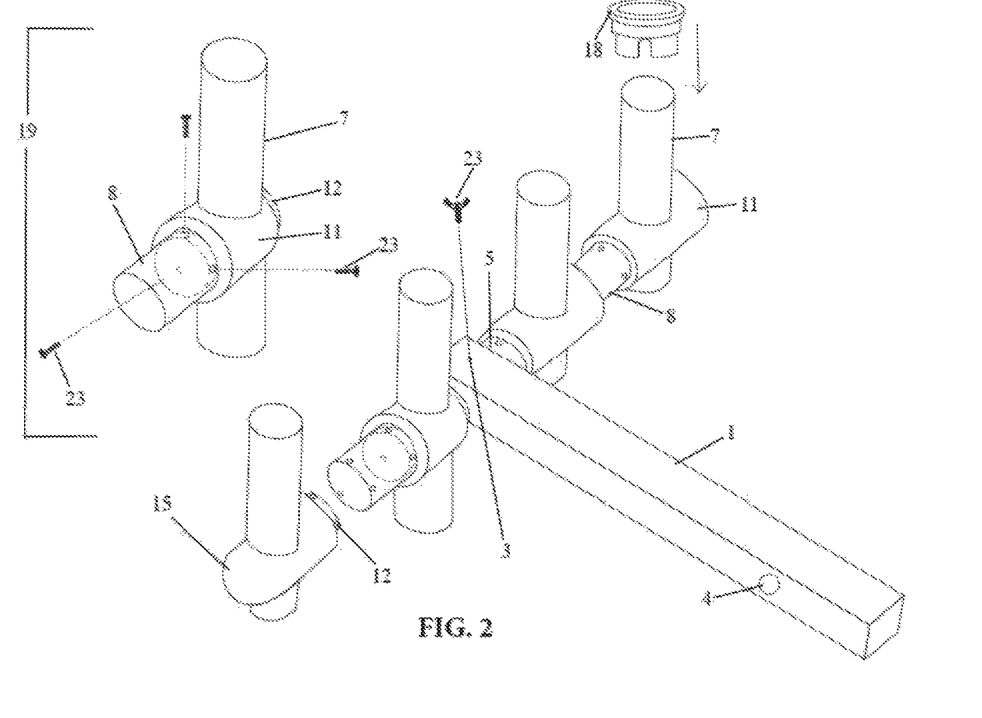
FIG. 2 is a perspective view of the apparatus, and separately the parts of the apparatus comprising a lateral segment.

In FIG. 2, a perspective view of the apparatus for holding and transporting fishing rods is shown, and separately the lateral segment 19 is depicted. The device is modular and can be expanded incrementally for increased capacity. In one embodiment, the main shaft 1 is secured to the main spacer 5 with a threaded butterfly screw that is easily inserted and removed to secure and release the parts respectively and can thereby alter their positions relative to each other. One skilled in the art would appreciate that various types of fasteners including but not limited to screws, rivets, bolts, anchors, ties, and the functional equivalent would be appropriate and included in this disclosure. The lateral segments 19 are independent of each other, and may be individually connected to each other via attachment to receiver spacers 8, or to receiver end components including an end rod holder receiver 15, which is closed at the distal end, for placement as the last lateral segment included in the assembled apparatus. Lateral segments 19 comprising a rod holder 7 and a rod holder receiver 11 further comprising a receiver connector 12 and a plurality of apertures are releasably attached to the main shaft 1 via the main spacer 5 with fasteners 23 that pass through apertures in the various component parts. The receiver connector 12 is part of and may be integrated with the rod holder receiver 11; it may be on one or both ends of the rod holder receiver 11. A rod holder receiver 11 with a receiver connector 12 on one end and a closed second end is referred to as an end rod holder receiver 15. The receiver connector 12 is sized and shaped to conform to receiver spacers 8. Rod holder caps 18 are placed in the distal end (farthest from the main shaft 1 and spacers) of the rod holders 7 to protect the rods and the device from wear. The rod holder cap 18 conforms to and is supported by a rod holder 7 at an open top; the rod holder cap 18 is comprised of a flexible and sturdy material such that it can flex slightly to fit over the open top of a rod holder 7 and will return to and maintain its configuration around the rod holder 7; said rod holder cap 18 further comprises an outer lip, an outer wall, an inner wall and a gap therebetween such that it can be positioned around the rod holder open top, which is slid into the gap with the inner wall inside the rod holder, the gap traversing the top edge of the rod holder and the outer wall surrounding a portion of the outside of the rod holder.

Figure 3:
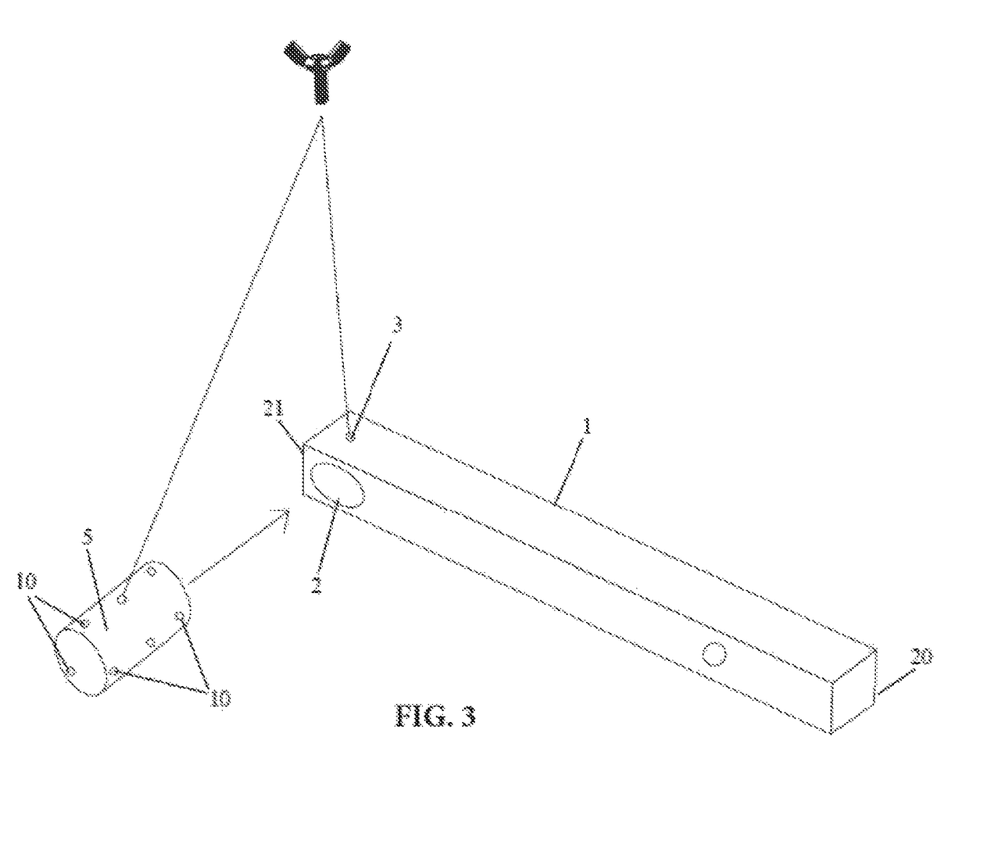
FIG. 3 illustrates the main shaft and its removeable and positionable attachment to the main spacer.

FIG. 3 illustrates the main shaft and its removeable and positionable attachment to the main spacer 5. The main shaft 1 comprises at least a main shaft first end 20 and a main shaft second end 21. The main shaft spacer receiving channel 2 is located on and passes horizontally through the main shaft second end 21 such that when assembled the main spacer 5 protrudes from both sides of the main shaft second end 21 and is positioned perpendicular to the main shaft 1. The main spacer 5 is slightly smaller than the main shaft spacer receiving channel 2, such that the main spacer 5 is supported by and capable of pivoting within the main shaft 1 to align apertures in the main spacer 5 at various positions with main shaft securing apertures 3 and be releasably secured thereon with one or more removeable swivel components 28. The main spacer 5 can be removably affixed to the main shaft second end 21 by passing a swivel component 28 such as a threaded screw through the main shaft securing aperture 3 and into the main spacer securing aperture 6 located on the main spacer 5. In a preferred embodiment, an axial cross-section of the main spacer 5 is substantially circular, and the removeable swivel components 28 are butterfly screws, so the swivel component 28 can be manipulated by hand by a user without the use of a tool (for example, a screwdriver). The rod holder 7 inserts vertically into the rod holder receiver vertical channel 9 of the rod holder receiver 11, which traverses the rod holder receiver 11 and conforms to and supports a rod holder 7. Once inserted, the rod holder 7 may be removably affixed to the rod holder receiver 11 by passing a fastener 23 through the receiver end aperture 14 and into the rod holder aperture 17. A rod holder receiver 11 may be removably affixed to either or both main spacer open ends 28 of the main spacer 5. The receiver connectors 12 of the rod holder receiver 11 fit into the main spacer open ends 28 of the main spacer 5 and are removably affixed by passing fasteners 23 through main spacer apertures 22 and into receiver apertures 13. A series of rod holder receivers 11 is assembled by connecting a receiver spacer 8 between two lateral segments 19 by connecting each end of a receiver spacer 8 to an available receiver connector 12 on each of two rod holder receivers 11. Each receiver connector 12 fits into the receiver spacer open end 27 of the receiver spacer 8 and is removably affixed by passing fasteners 23 through spacer apertures 10 and into receiver apertures 13. To complete assembly, an end rod holder receiver 15 with end rod holder receiver closed end 16 may be removably affixed by connecting the end rod holder receiver 15 to the receiver spacer open end 27 of the receiver spacer 8 attached to the last rod holder receiver 11 by removably affixing them by passing fasteners 23 through the spacer apertures 10 to one end of the receiver spacer 8 and into the receiver apertures 13, and by passing fasteners 23 through the spacer apertures 10 in the opposite end of the receiver spacer 8 and into the spacer apertures 10 located on the receiver connector 12 of the end rod holder receiver 15.

Figure 4:
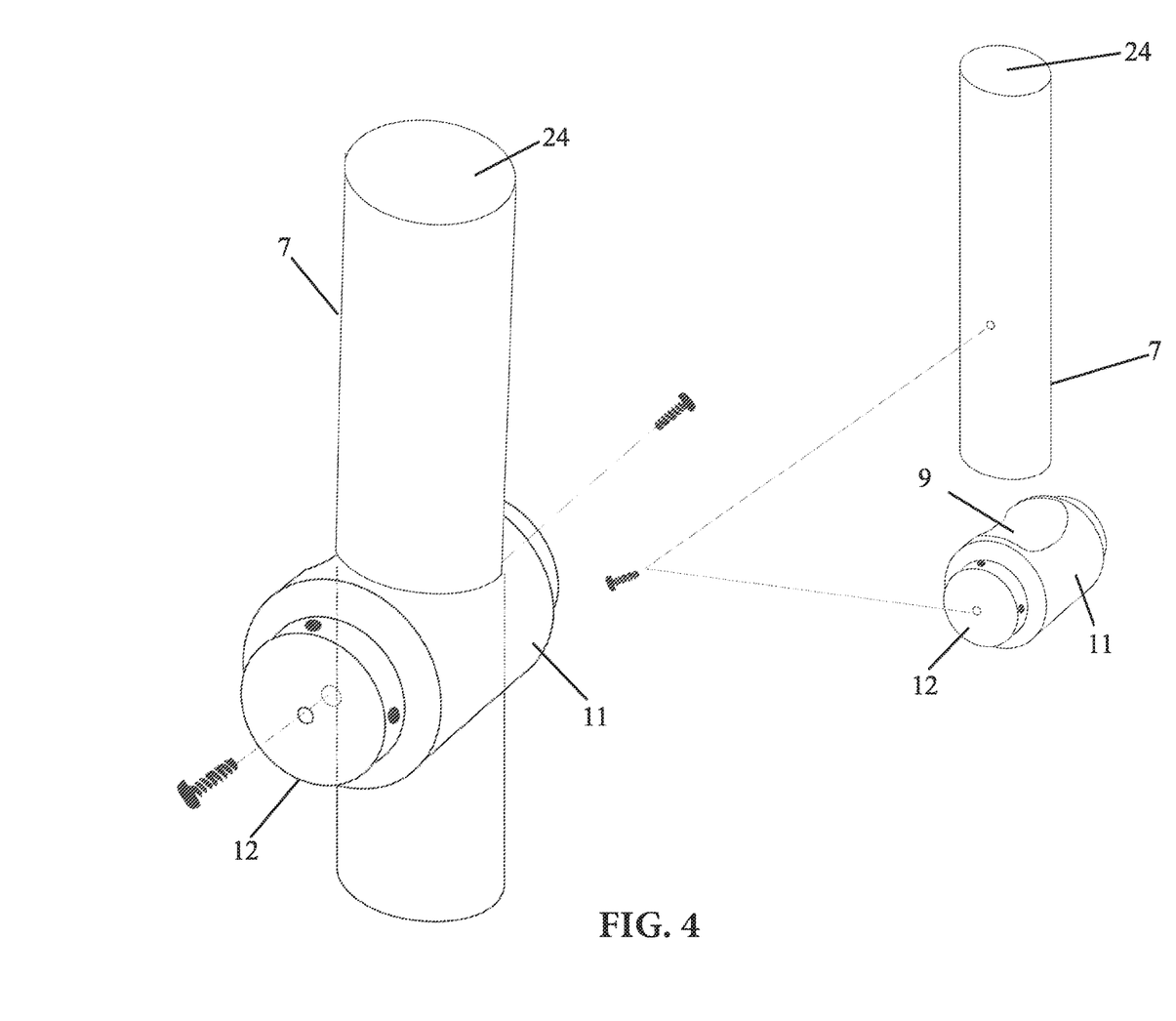
FIG. 4 is a view of the lateral segment, showing a rod holder removably affixed to a receiver.

In FIG. 4, the component parts of the lateral segments are shown in greater detail. The rod holder 7 is sized and shaped to conform to the rod holder receiver vertical channel 9 that is positioned in the center of the receiver connector 12, which allows the rod holder 7 to enter the receiver vertical channel 9 and be secured therein by aligning apertures in the rod holder 7 to apertures in the receiver spacer 8 and passing fasteners 23 therethrough. Fasteners 23, such as the threaded screws depicted in the figure, removably secure the components by passing through aligned apertures and tightening them in place. In a preferred embodiment, the rod holder receiver 11 is connected to the apparatus by passing one or more threaded screws into one or more apertures in the rod holder receiver connector 12 and the apertures in a receiver spacer or the end rod holder receiver closed end 16. The rod holder receiver connector 12 serves as an anchoring point between the rod holder receiver 11 and the spacers.

The diameter of the rod holder 7 is sufficiently smaller than the rod holder receiver vertical channel 9 so that the rod holder 7 may fit into the rod holder receiver vertical channel 9. The rod holders 7 support and hold fishing rods by receiving the fishing rod handle into the upper end opening of the rod holder 7. The rod holder 7 may include material such as, but not limited to, rubber, plastic, or other suitably strong, flexible and supportive material, to prevent the upper end opening of the rod holder 7 from damaging components of the fishing rod, as well as reduce rattling between the rod holder 7 and the fishing rod during transport. A rod holder cap 18, made of sturdy but soft-textured material such as silicon or rubber, may be placed on or secured to the end of the rod holder 7 to protect the rod and the apparatus from wear.

FIG. 5 shows the apparatus in its positionable configurations. The invention can quickly and easily shift the position of the rods to accommodate access to a vehicle, positioning the device on the ground or in the sand, and carrying or transporting fishing rods. The main spacer 5 is pivotable, or capable of pivoting or movement within the main shaft receiving channel 2 to allow the positionable setting of the rod holders 7 relative to the main shaft 1. In this figure, the swivel component 28 is shown, which allows the apparatus to pivot in order to easily change to a horizontal configuration.

Once the apparatus is assembled, the main shaft first end 20 is inserted into a vehicle's trailer hitch receiver and connected therein. The main shaft 1 may be horizontally oriented so that the first end of the main shaft 1 inserts directly into the vehicle trailer hitch; alternatively the main shaft 1 may be oriented diagonally, with a joint at each end to keep the apparatus level to the vehicle, so that the apparatus may be elevated relative to the vehicle trailer hitch. In various embodiments, the sequence of rod holder receivers 11 and receiver spacers 8 may be assembled perpendicular, parallel, diagonal, or a variety of orientations relative to the main shaft 1. Once attached to the vehicle, the apparatus is loaded with fishing rods, typically in a vertical orientation.

In a preferred embodiment, the main shaft second end 21 receives the main spacer 5, which fits securely with the main shaft receiving channel 2. One or more fasteners 23 are locatable through the main shaft receiving channel 2 and then received by main spacer securing apertures 6 so that the main spacer 5 is removably affixed to the main shaft 1. The main shaft receiving channel 2 is of sufficiently larger diameter than the main spacer 5 so that the main spacer 1 may fit within the main shaft receiving channel 2. The main spacer 5 can be rotated within the main shaft receiving channel 2 in order to allow for various vertical and horizontal configurations of the apparatus. This positionable aspect of the invention allows for convenient access to the vehicle when attached and also functionality when it is not attached to the vehicle. For example, a horizontal configuration of the apparatus can be used for when the back of the vehicle needs to be accessed without removing the entire apparatus from the hitch.

Figures 5A, 5B:
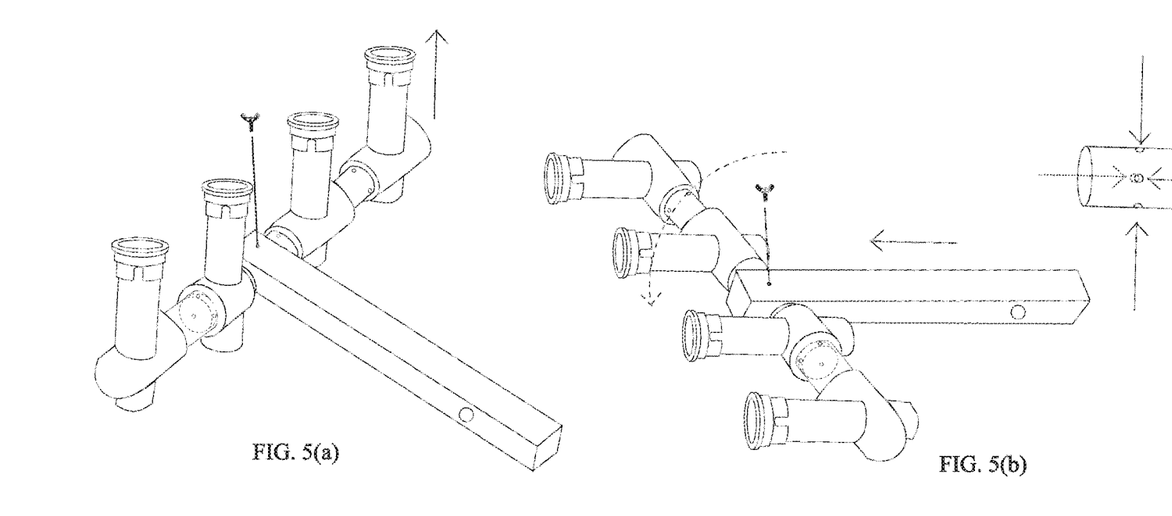
Figure 5C:
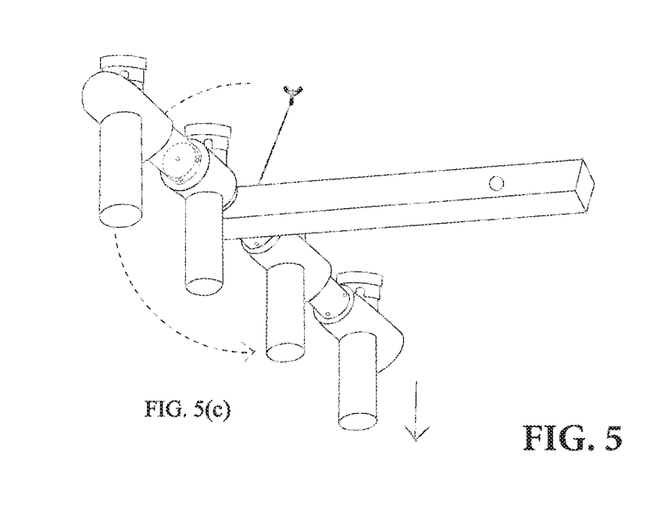
Figure 5D:
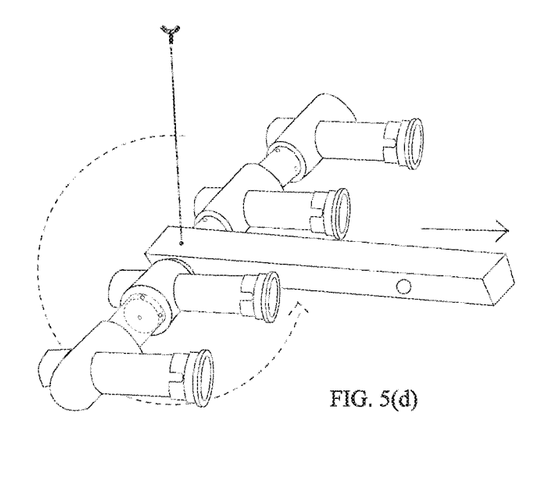

FIG. 5 (a) shows the apparatus in an upright orientation. This position is easy to load and unload rods from and is effective for transportation. In FIG. 5 (b), the main spacer 5 is released from attachment within the main shaft receiving channel 2 and rotated to position it such that the rod holders 7 are at a different position relative to the main shaft 1, then secured therein with a fastener 23. In this way the device can conveniently allow for access to a trunk or hatch, and can also be used as a sandspike, to carry multiple rods, or as a holder for rods on various surfaces when not engaged with a vehicle. In FIG. 5 (c), the rod holders 7 are oriented downward. This orientation is useful for carrying poles. FIG. 5 (d) shows the rod holders 7 facing inside. This is appropriate when the rods are not in the apparatus, for example between use. One skilled in the art would appreciate that any number of apertures could be positioned upon the main spacer 5 to facilitate positionable placement of fishing rods at any angle relative to the main spacer 1.

Figure 6:
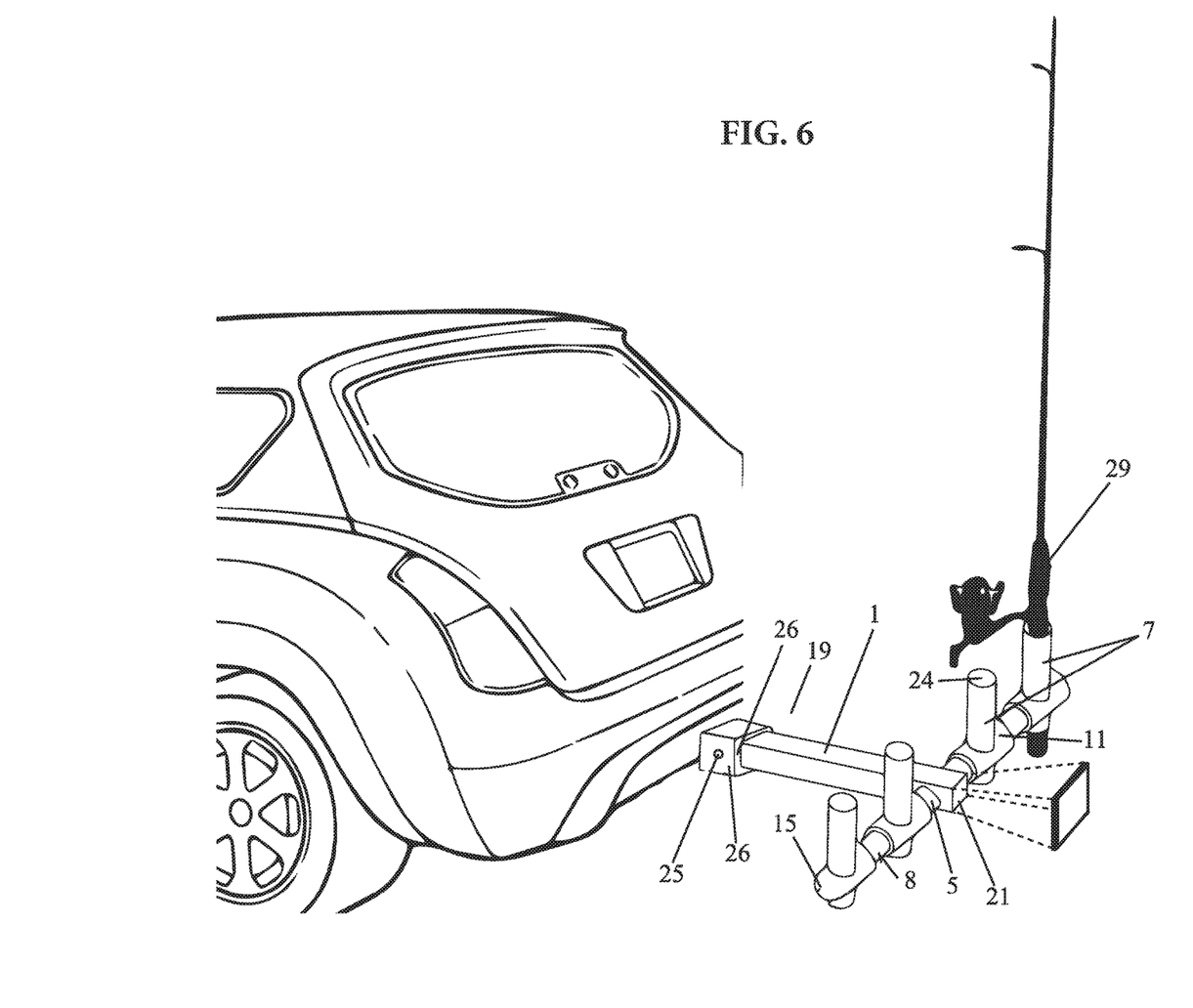
FIG. 6 shows the apparatus assembled and attached to a vehicle.
Figure 7:
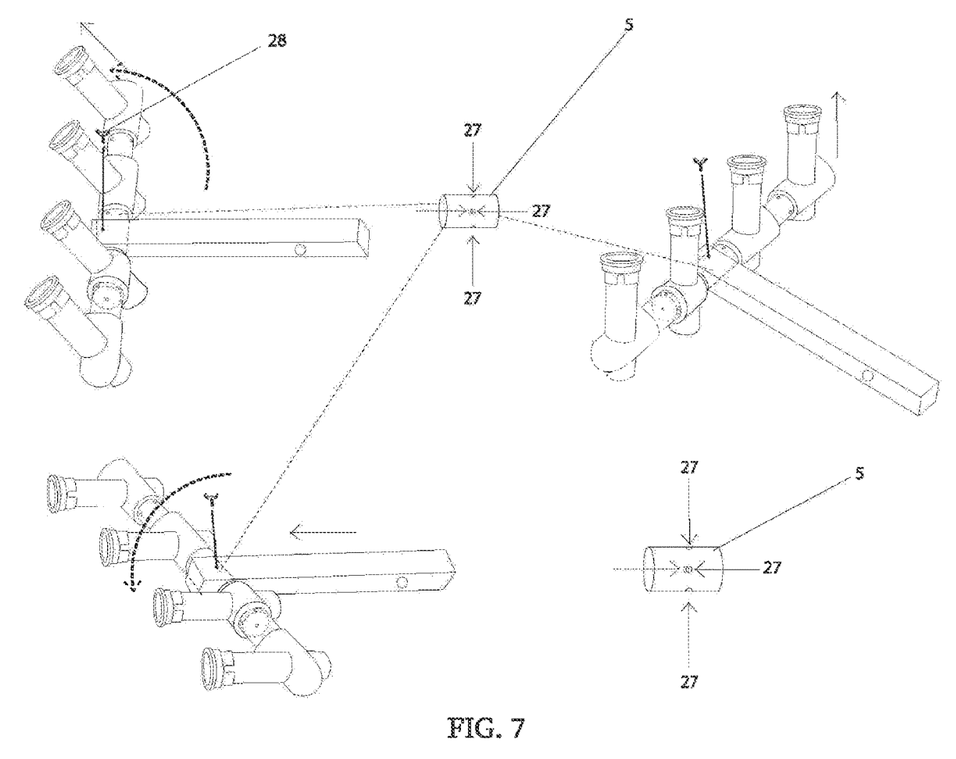
FIG. 7 shows the hand-acuated swivel component of the apparatus, including a main spacer pivotable relative to the main shaft.

In FIG. 6, the apparatus is shown attached to a vehicle. The apparatus is assembled, then the main shaft first end 20 is inserted into a vehicle's trailer hitch receiver and is connected therein. Optionally a tail light can be added to the main shaft second end 21. Fishing rods are placed within the fishing rod holders 7 for transportation by inserting their handles into the assembled apparatus. The apparatus can remain attached to the vehicle out of the way in this position, or it can be removed and disassembled for easy and convenient storage. The apparatus is portable, easy to carry, and readily assembled and disassembled for transportation or storage.

I claim:

1. A portable apparatus for holding and transporting fishing rods comprising:
   i. a main shaft further comprising one or more main shaft securing apertures, a longitudinal axis, and at least two ends, wherein the first end is removably attachable to a vehicle's trailer hitch with fasteners at said one or more main shaft securing apertures, and the second end further comprises a main shaft receiving channel and is removably attachable to a main spacer pivotable relative to the main shaft;
   ii. the main spacer further comprising a plurality of apertures and capable of connection with said main shaft; said main spacer fits within the main shaft receiving channel located in the main shaft such that said main spacer can pivot and be secured at various positions within said main shaft;
   iii. one or more lateral segments, wherein each lateral segment can be independently, removably added to the apparatus by attaching a lateral segment to the main spacer or to additional lateral segments, thereby allowing for modular extension and expansion of the capacity of the apparatus; and wherein each lateral segment further comprises a rod holder receiver capable of securing and supporting a rod holder; a rod holder; and a rod holder cap; and iv. one or more receiver spacers capable of connecting with the one or more lateral segments or an end rod holder receiver; said receiver spacer or spacers conform to and are removeably secured by connection with fasteners to a receiver connector on the rod holder receiver.

2. The apparatus of claim 1, wherein the main shaft is removeably attached to a vehicle by passing fasteners through securing apertures in the main shaft and removeably connecting said fasteners with the receiver of a vehicle's trailer hitch; and wherein the main shaft is also removeably attached to the main spacer that connects said main shaft to lateral segments.

3. The apparatus of claim 2 wherein the rod holder receiver and rod holder are constructed as a single component.

4. The apparatus of claim 2 wherein the rod holder receiver and receiver spacer are constructed as a single component.

5. The apparatus of claim 1, wherein the main spacer fits within the main shaft receiving channel located in the main shaft and is supported therein; the main spacer is slightly smaller than said main shaft spacer receiving channel, such that said main spacer is supported by and capable of pivoting within said main shaft to align apertures in the main spacer at various positions with main shaft securing apertures and be releasably secured thereon.

6. The apparatus of claim 1, wherein the one or more lateral segments are removeably attached to at least the main spacer and also removeably attached to one or more receiver spacers; said main spacer or receiver spacers attach to the lateral segment with fasteners passing through apertures in the spacers and into the rod holder receiver at one or more rod holder receiver connectors.

7. The apparatus of claim 6, wherein the rod holder receiver is configured with two rod holder receiver connectors positioned opposite to each other on either side of a rod holder receiver channel that traverses the rod holder receiver and conforms to and supports a rod holder.

8. The apparatus of claim 6, wherein the rod holder receiver is configured with a single rod holder receiver connector for use at the end of a series of two or more lateral segments, comprising a rod holder receiver connector at a first end and closed at a second end; said rod holder receiver connectors serve as fastening points for the main spacer or receiver spacers.

9. The apparatus of claim 1, wherein the rod holder is removeably positioned within the rod holder receiver and secured therein with one or more fasteners, and wherein each rod holder has an open top end to receive a fishing rod.

10. The apparatus of claim 1, wherein the first end of the main shaft comprises a main shaft securing aperture, is insertable into a vehicle's trailer hitch receiver and is removably affixed therein by a hitch pin; said hitch pin is passed through apertures in said vehicle's trailer hitch receiver and also passed through said main shaft securing aperture in said first end of the main shaft.

11. The apparatus of claim 1, whereby the second end of the main shaft has one or more brake lights; wiring of the one or more brake lights passes through the main shaft to the trailer hitch receiver and connects to the trailer hitch brake light wiring.

12. The apparatus of claim 1 wherein the rod holder receivers and receiver spacers are assembled perpendicular, parallel, or diagonal relative to the main shaft.

13. The apparatus of claim 1 wherein the rod holder receiver, rod holder and receiver spacer are constructed as a single component.

14. The apparatus of claim 1 further comprising apertures within the rod holders that can receive lockable cable or locks that attach to or integrate with the rod holders; and also further comprising lockable cable or locks to secure and lock fishing rods within the apparatus.

15. The apparatus of claim 1 further comprising a one-point, hand actuated swivel component that allows the main spacer and lateral segments connected thereto to pivot in order to change to a horizontal configuration, rendering a hatch, door or tailgate of a vehicle accessible while the device and rods are still attached; said attachment and swivel components require no tools to actuate pivot and change the apparatus configuration.

16. A method of assembly and use of the apparatus of claim 1 comprising the steps of:
  i. assembling the apparatus by
    a) inserting the main spacer into the main shaft receiving channel in the main shaft and releasably securing it there with a butterfly screw or other easily releasable fastener;
    b) attaching lateral segments to the main spacer at a receiver connector by inserting the receiver connector into a receiver spacer open end and securing with fasteners therein, and repeating, adding additional lateral segments until the desired number of lateral segments and rod holders is attached; said lateral segments can be independently positioned or secured to spacers and rotated as a unit;
    c) when the desired number of lateral segments have been attached, connecting an end rod holder receiver as the last lateral segment;
    d) placing a fishing rod in the device by inserting it into rod holder through the rod holder open top end;
    e) inserting the main shaft into the trailer hitch receiver of a vehicle and fastening it therein with a hitch pin;
  ii. transporting fishing rods within the apparatus while attached to a vehicle with the fishing rods in the fishing rod holders oriented with the handle end of the rod closest to the ground;
  iii. removing the apparatus from attachment with the vehicle by removing the hitch pin and sliding the main shaft out of the trailer hitch receiver and carrying the device with the fishing rods in the fishing rod holders oriented in the same plane as the main shaft;
  iv. stabilizing the fishing rods in the sand or on the ground by placing or sinking the apparatus slightly in the sand or on the ground with fishing rods supported in the fishing rod holders within the device;
  v. disassembling the apparatus by removing the main shaft from the trailer hitch receiver of a vehicle, removing all fasteners and disconnecting all apparatus components.

* * * * *